United States Patent [19]

Clausen et al.

[11] Patent Number: 4,821,980
[45] Date of Patent: Apr. 18, 1989

[54] VIBRATION ISOLATING ENGINE MOUNT

[75] Inventors: Charles C. Clausen, Seattle; Ronald C. Johnson, Fall City; Wan T. Chee, Bellevue, all of Wash.; Warren E. Schmidt, Erie, Pa.

[73] Assignee: The Boeing Company, Seattle, Wash.

[21] Appl. No.: 102,045

[22] Filed: Sep. 29, 1987

[51] Int. Cl.[4] .............................................. B64D 27/26
[52] U.S. Cl. ....................................... 244/54; 248/557
[58] Field of Search .................... 244/54; 248/554, 557

[56] References Cited

U.S. PATENT DOCUMENTS

| | | |
|---|---|---|
| 2,863,620 | 12/1958 | Vautier . |
| 3,223,360 | 12/1965 | Hertel et al. . |
| 3,487,888 | 1/1970 | Adams et al. .......................... 244/54 |
| 3,490,556 | 1/1970 | Bennett, Jr. et al. ................. 244/54 |
| 3,666,211 | 5/1972 | Cathers et al. . |
| 3,735,946 | 5/1973 | Mullins . |
| 3,809,340 | 5/1974 | Dolgy et al. . |
| 4,044,973 | 8/1977 | Moorehead . |
| 4,326,682 | 4/1982 | Nightingale . |
| 4,555,078 | 11/1985 | Grognard . |
| 4,585,189 | 4/1986 | Buxton . |
| 4,603,821 | 8/1986 | White . |

FOREIGN PATENT DOCUMENTS 1456139 12/1968 Fed. Rep. of Germany ........ 244/54

Primary Examiner—Joseph F. Peters, Jr.
Assistant Examiner—Rodney Corl
Attorney, Agent, or Firm—Christensen, O'Connor, Johnson & Kindness

[57] ABSTRACT

A strut for mounting an engine and isolating the vibration of the engine from the framework of an aircraft to which it is attached. An engine mounting strut (32) includes a forward spar (40), which extends outwardly from a rib (34) of an aircraft (20). An aft spar (62) similarly extends outward from a rib (38) and is pivotally connected to a box beam (42) in a vibration isolation mount (78). The pivotal axis of mount (78) is generally aligned with the longitudinal axis of the box beam. A vibration isolation arm (44) extends from a pivotal connection (82) having an axis generally orthogonal to the longitudinal axis of the box beam and is connected to the forward spar at two spaced-apart vibration isolation mounts (46 and 84). The spars are enclosed with an aerodynamic skin (56) forming a torque box 48, to which are attached forward and aft fairings (58).

23 Claims, 4 Drawing Sheets

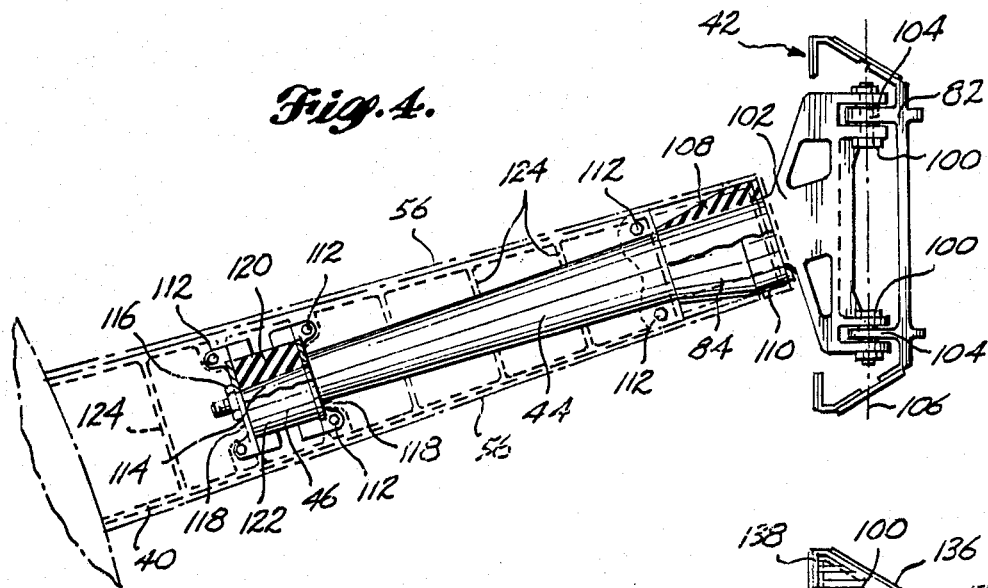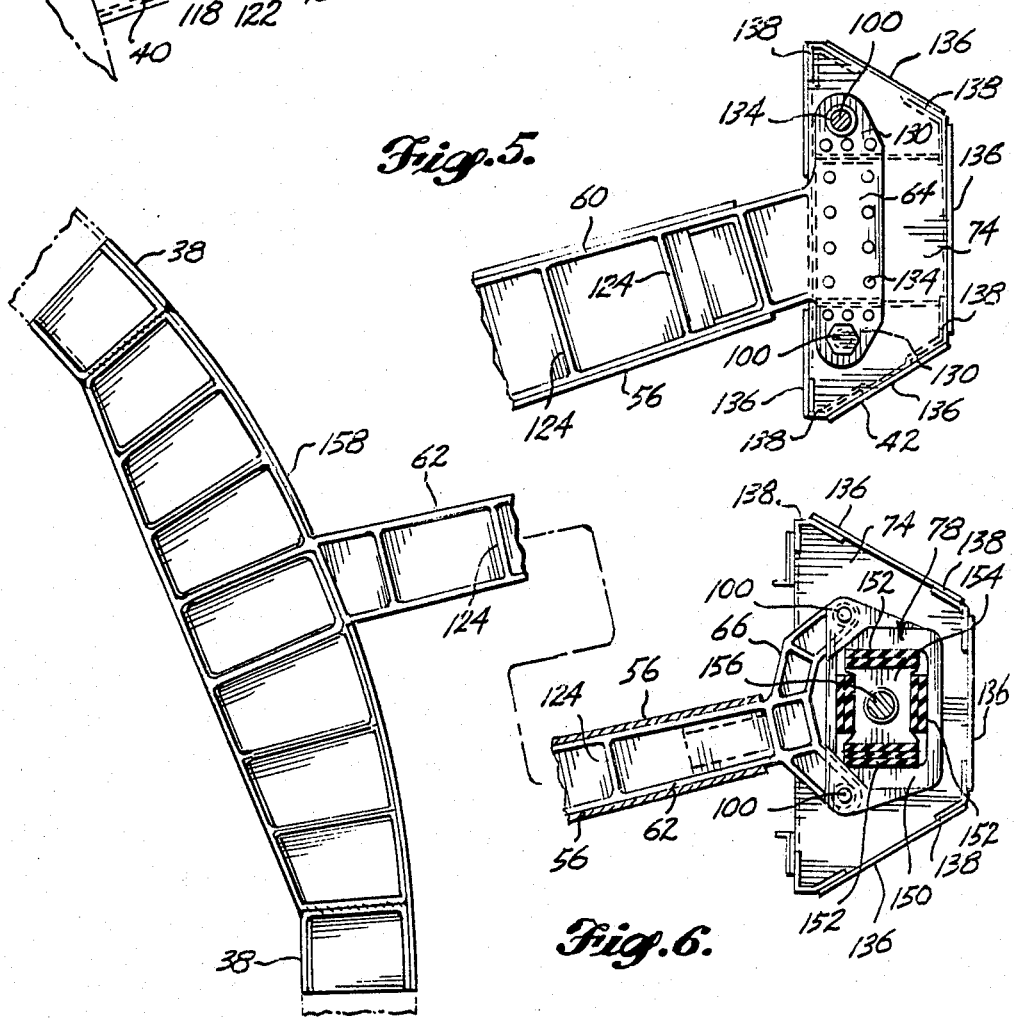

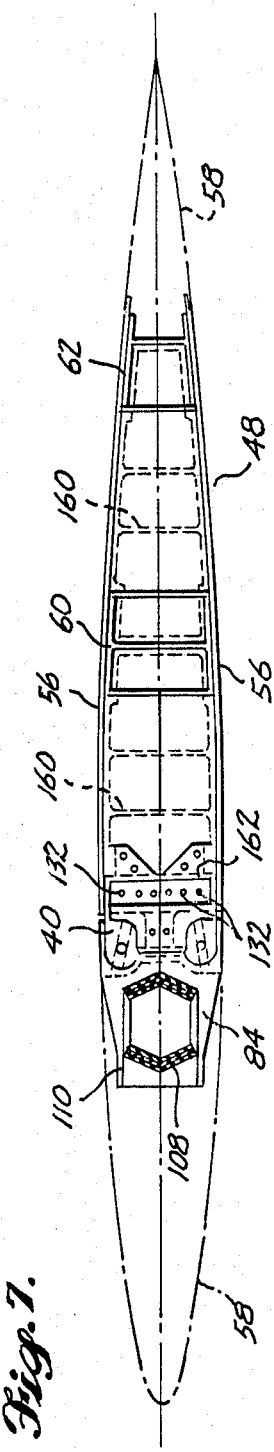
Fig. 7.
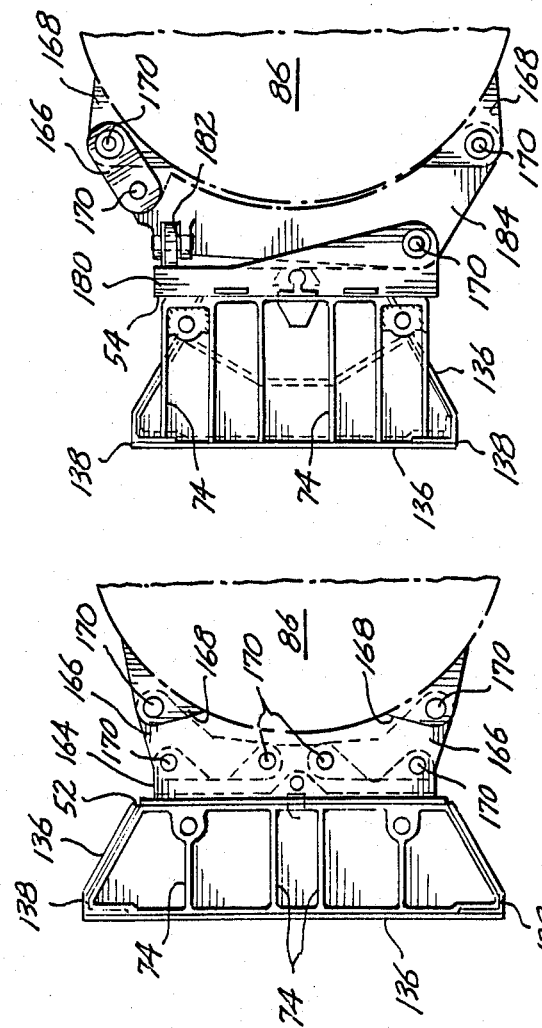
Fig. 9.
Fig. 8.

VIBRATION ISOLATING ENGINE MOUNT

TECHNICAL FIELD

The present invention generally pertains to an aircraft engine mount and, specifically, to an aerodynamic engine mount incorporating vibration isolation.

BACKGROUND OF THE INVENTION

A mounting strut for an aircraft engine suspended from a wing or from a side of an aircraft's fuselage must be capable of supporting the torque and axial loads generated by the engine, and in addition, isolate the fuselage and passenger section of the aircraft from shock and vibration produced by the engine. Several different approaches have been developed in the prior art to accomplish these functions. For example, a prior art assembly used for mounting turbine and low bypass turbo fan jet propulsion engines to an aircraft includes a shock absorbing mount structure attached either to the turbine casing or to the turbine and fan casing of the engine; a nacelle structure is then rigidly attached to the shock mounting structure. This approach requires that a relatively complex vibration shock mounting structure and seals be used to provide for the relative movement between the engine and the nacelle. In another approach, the engine is shock mounted within a relatively heavy load bearing nacelle structure, and the nacelle is rigidly attached to the fuselage by a strut.

A mounting arrangement developed for attaching a high bypass turbo fan jet engine to an aircraft fuselage is shown in U.S. Pat. No. 4,044,973. This engine mount uses dual beam structural yokes that extend around a portion of the periphery of the fan casing and are affixed to the fuselage. Both yokes are enclosed in an aerodynamic fairing and are attached to the turbo fan casing by elastomeric shock mounts.

None of the prior engine mounting designs is well adapted for use in mounting unducted fan (prop fan) engines to the aft sides of an aircraft fuselage. Prop fan engines must be mounted in a manner that permits large deflections between the engine and the supporting structure, so that low frequency vibrations caused by fan blade imbalance are isolated in the vertical, axial and lateral directions. In addition, since the center of gravity of the prop fan engine and nacelle assembly is near the extreme aft end of the supporting structure, the mount system must be capable of distributing the vertical, lateral and torque loads forward along the longitudinal length of the engine assembly. It is also desirable that the engine mount system has a relatively thin cross section. The supporting strut that extends between the fuselage and the prop fan engine should be lightweight and aerodynamic to avoid excessive drag. Prior art engine mounts do not permit sufficient decoupling of vertical, lateral and torque loads for use in mounting a prop fan engine, and would require a relatively heavy strut having an excessive cross-sectional thickness to carry the off-center loading characteristic of a prop fan engine.

SUMMARY OF THE INVENTION

For use in mounting an engine assembly to an aircraft, an apparatus is provided that includes a beam extending adjacent to the engine assembly, generally parallel to its longitudinal axis. A first spar (front spar) is affixed to the structural frame of the aircraft and extends outwardly from the frame toward the beam, but is not directly or rigidly connected to it. A second spar (aft spar) is also affixed to the aircraft framework at one end and is pivotally connected to the beam at its other end, the pivotal connection allowing motion about an axis that is substantially parallel to the longitudinal axis of the engine assembly.

Extending generally parallel to and proximate the first spar is a vibration isolation arm. The vibration isolation arm is resiliently attached to the first spar with elastomeric vibration isolators at a plurality of spaced-apart points. It is pivotally connected to the beam, and is thus able to pivot about an axis that is substantially orthogonal to the longitudinal axis of the engine assembly.

Intermediate the first and second spars is a third spar (mid spar) that serves as a backup support should one of the other spars fail. One end of the third spar is affixed to the framework of the aircraft and the other end to the beam, in a joint having substantial free play so that the third spar does not normally support the weight of the engine assembly or carry any loads produced by it. A smooth skin aerodynamically encloses the first, second and third spars, and the vibration isolation arm, and generally defines a streamlined strut extending between the fuselage and the engine assembly.

The engine mount comprising the present invention permits decoupling of both vertical and lateral motion through the vibration isolation arm and the pivotal connections, while controlling engine roll moment. The laterally extending vibration isolation arm and overall beam geometry tend to shield elastomeric vibration isolators used to connect the vibration isolation arm to the first spar and to connect the second spar to the beam, from heat, thereby extending their useful life. Use of the beam eliminates the need for a fixed cowl and separate firewall, as is common in the prior art engine mount designs, and the trapezoidal configuration of the beam avoids the need for long, movable cowl support hinge arms and reduces the part count as compared to prior art designs. These and other advantages of the present invention will be apparent from the disclosure of the preferred embodiment and the attached drawings.

BRIEF DESCRIPTION OF THE DRAWINGS

FIG. 4 is an elevational view showing a cross section of the beam, and showing a cutaway view of two vibration isolation mounts, a vibration isolation arm and a front spar;

FIG. 5 is an elevational view in cross section of the beam and a portion of a middle spar;

FIG. 6 is an elevational view in cross section of the beam, and an aft spar and vibration mount;

FIG. 7 is a cross-sectional view of the engine mount strut;

FIG. 8 is a cross-sectional view illustrating linkage used to connect the forward portion of the engine to the beam; and FIG. 9 is a cross-sectional view showing linkage used to connect the aft portion of the engine to the beam.

DISCLOSURE OF THE PREFERRED EMBODIMENT

Figure 1:
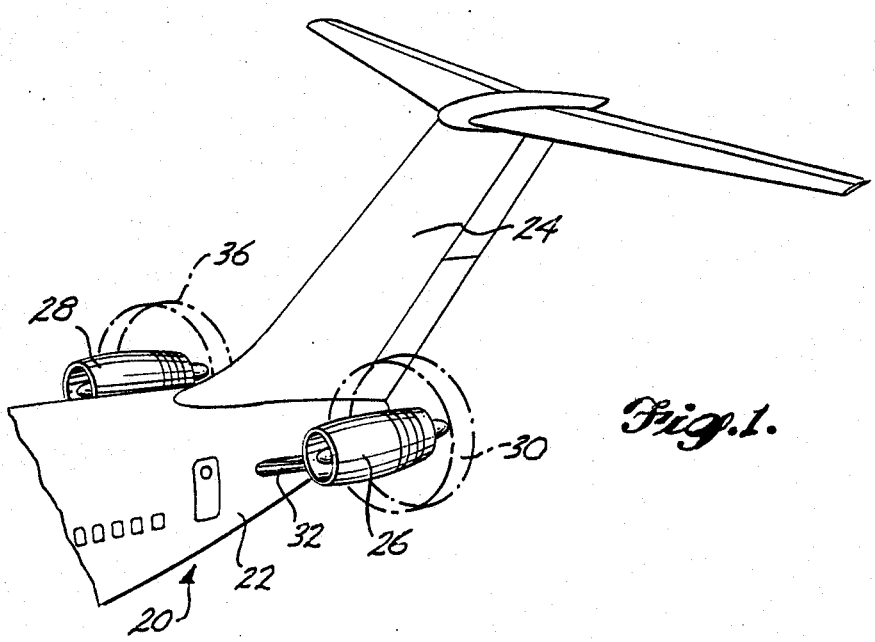
FIG. 1 is a cutaway isometric view of the tail section of an aircraft on which two prop fan engines are mounted at each side of the fuselage, using the present invention.

With reference to FIG. 1, the aft portion of a passenger-type aircraft 20 of a generally conventional design is shown on which are mounted two unducted fan (prop fan) engine assemblies 26 and 28. The prop fan engine assemblies are mounted on each side of the rear fuselage 22, generally adjacent the point where the tail assembly 24 rises vertically from the top of the fuselage. The port side engine assembly 26 is supported by an engine mounting strut 32 which extends laterally from fuselage 22. The starboard engine 28 is likewise supported by a similar engine mounting strut (not shown), which extends laterally from the opposite side of the fuselage. Engine assemblies 26 and 28 provide the prime driving force for turning props 30, disposed at the aft end of each engine assembly.

Figure 2:
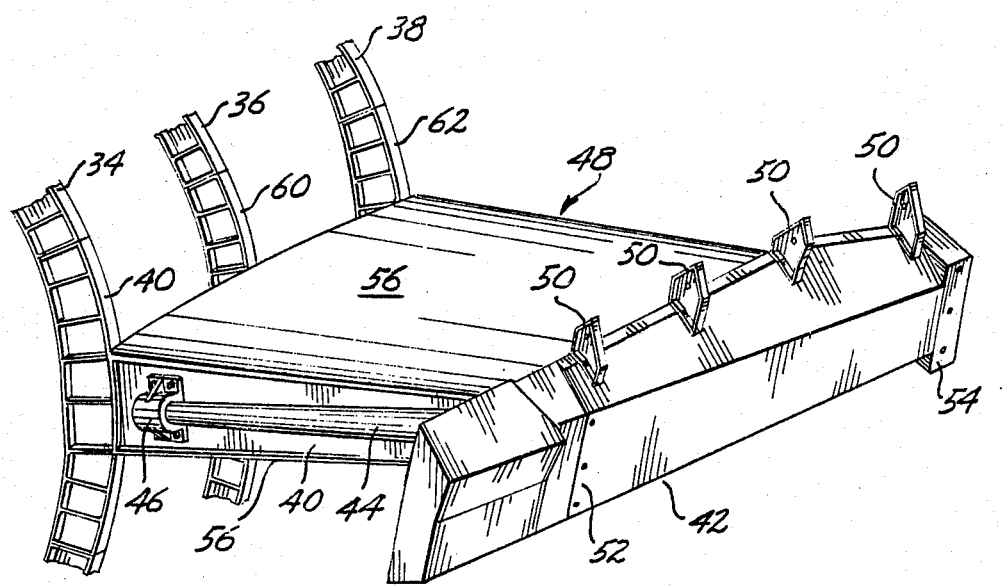
FIG. 2 is a cutaway isometric view of the engine mounting assembly comprising the present invention, with the forward and aft fairings omitted.
Figure 3:
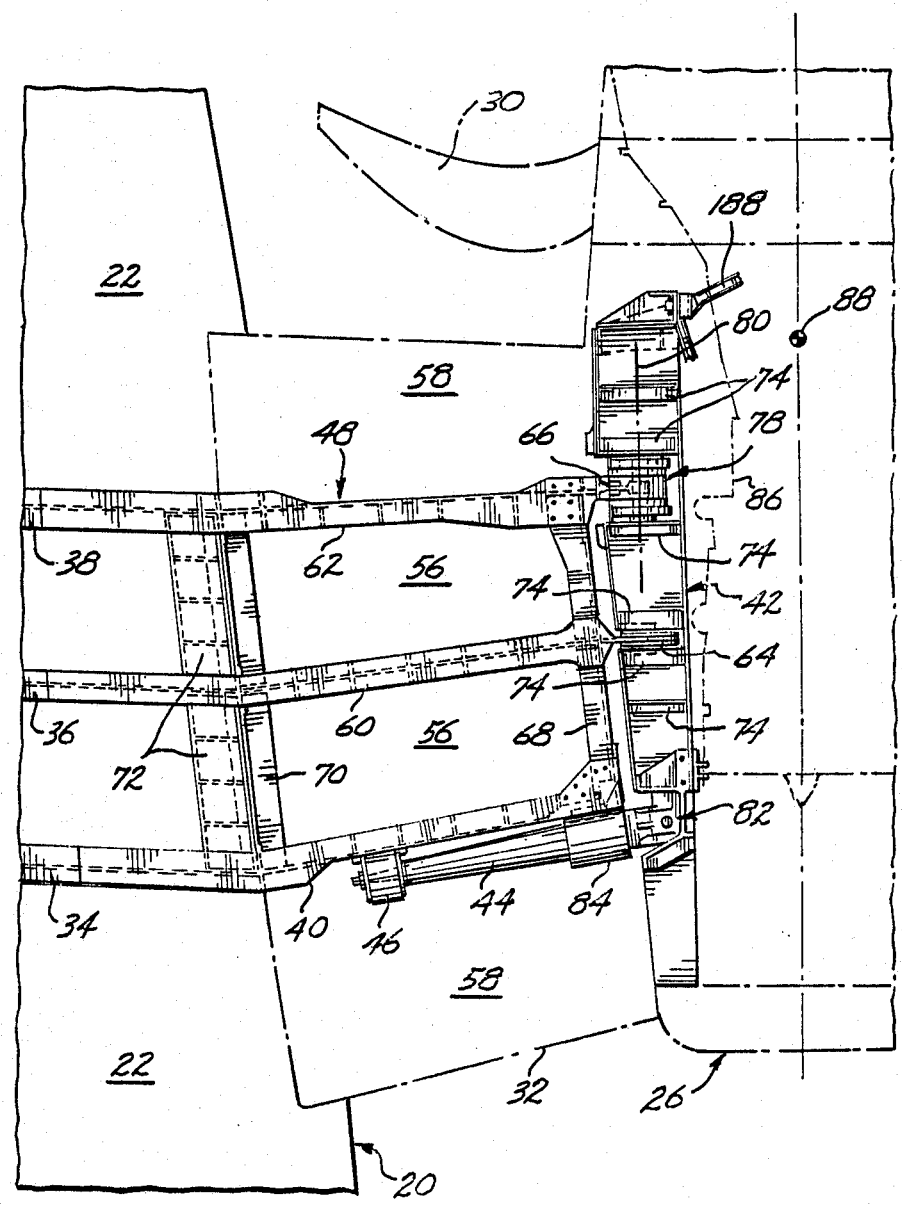
FIG. 3 is a cutaway plan view of the engine mount, showing in cross section a beam to which the engine is attached, and a partial profile of the engine assembly.

Details of engine mounting strut 32 are shown in FIGS. 2 and 3. To simplify the drawing, only an outline of the forward and aft fairings 58 are shown (in FIG. 3). With reference to FIG. 3, a forward spar 40, a mid spar 60 and an aft spar 62 extend outwardly generally parallel to each other from the structural frame of fuselage 22 where they are attached to ribs 34, 36 and 38, respectively by welding or with a bracket plate (not shown). The ribs 34, 36 and 38 comprise part of the structural frame of fuselage 22. The outwardly extending end of mid spar 60 terminates in an end plate 64, which extends into a vertical slot formed within a box beam 42. Box beam 42 is disposed within the enclosure of engine assembly 26 and extends substantially parallel to its longitudinal axis. A mounting assembly 66 is used to attach the outwardly extending end of aft spar 62 to box beam 42. Disposed proximate to and parallel with box beam 42, is a close out rib 68, which connects each of the spars 40, 60 and 62, and defines an upper and lower surface for support and attachment of an enclosing skin 56. Proximate to fuselage 22, a close out rib 70 extends between spars 40, 60 and 62, likewise defining a supporting surface for the enclosing skin. A shelf beam 72 provides longitudinal support between each of spars 40, 60 and 62 inside the framework of fuselage 22. The rigid attachment of spars 40, 60 and 62 to the fuselage and the internal bracing provided by shelf beam 72, provide the structural rigidity and support needed to cantilever engine assembly 26 from the side of fuselage 22. Since spars 40, 60 and 62 are fixedly attached to the framework of fuselage 22, any vibration isolation between the fuselage and the engine assembly 26 must occur in the attachment of box beam 42 to the spars.

Turning now to FIG. 2, a portion of the framework of aircraft 20 comprising the fuselage and engine support strut 32 is shown with the fuselage skin removed. The forward and aft fairings, and the engine and the cowling normally enclosing it are omitted in the drawing figure in order to better show box beam 42 and other details of the mounting strut. A portion of the three fuselage ribs 34, 36 and 38 is exposed in FIG. 2, with rib 34 being the fordwardmost of the three. A vibration isolation arm extends from box beam 42, generally parallel to and proximate forward spar 40. It will be apparent from FIGS. 2 and 3 that forward spar 40 is attached to vibration isolation arm 44 but is not otherwise directly connected to box beam 42. The vibration isolation arm 44 is pivotally connected to box beam 42 and serves to support the box beam from a moment arm comprising the forward spar 40. A vibration isolation mount 46 connects the vibrating isolation arm to forward spar 40, as illustrated in FIG. 2; however, the other vibration mount disposed adjacent the distal end of the forward spar is not shown. The forward, mid and aft spars are covered by smooth sheet metal skin 56 on both their upper and lower surfaces to define a torque box assembly 48.

Box beam 42 includes four cowl hinges 50 along its upper surface and similar hinges (not shown) along its lower surface, by which a "D"-shaped cowl assembly may be pivotally attached to enclose engine assembly 26. In addition, box beam 42 includes a forward engine mount pad 52 and an aft engine mount pad 54 on which an engine assembly may be attached to the beam, as will be described below.

Under normal circumstances, the direct load imposed by engine assembly 26 on engine mounting strut 32 is carried primarily by forward spar 40 and aft spar 62, with the mid spar carrying load only as the load on the other two spars causes deflection of the mount. Mid spar 60 is loosely connected to the box beam 42 in a manner which does not transmit vibrations between the engine and the fuselage, unless a failure in the other should occur. However, since forward spar 40 and aft spar 62 transfer the entire load represented by the weight, torque, air drag, and the thrust of engine assembly 26 into torque box assembly 48, it is important that these spars be isolated from vibration produced by the engine. In addition, a large imbalance in props 30 is likely to subject box beam 42 and the vibration isolation mounts used to attach forward spar 40 to vibration isolation arm 44 and aft spar 62 to box beam 42 to a relatively large, vertical and lateral motion which must be decoupled from engine mounting strut 32.

An additional problem associated with mounting prop fan engine assembly 26 to an aircraft relates to the location of its center of gravity 88, indicated in FIG. 3 by a cross. Although radially disposed on the longitudinal axis of engine assembly 26, the center of gravity 88 of the engine assembly is located relatively close to the aft end of the engine, proximate props 30. The relatively extreme displacement of the center of gravity 88 from the nominal physical center of the engine assembly 26 imposes a substantially imbalanced load on engine mounting strut 32; however, box beam 42 acts to distribute the imbalanced load along the longitudinal length of the engine assembly 26, providing good distribution of the load between forward spar 40 and aft spar 62. Transverse plates 74 are disposed internal to box beam 42 and extend transversely to its longitudinal axis, providing torsional stability, internal rigidity and a supporting structure for mounting aft spar 62 and mid spar 60. An aft vibration isolation mount 78 used to attach aft spar 62 to box beam 42 is integrated into the beam and provides a pivotal connection thereto having an axis of rotation (represented in FIG. 3 with a dash-dot line 80) aligned with the longitudinal axis of the beam. Another pivotal mount 82 is used to attach vibration isolation arm 44 to box beam 42, and has a pivotal axis that is substantially orthogonal to the axis of rotation 80 of the aft vibration mount 78.

The manner in which vibration isolation arm 44 is mounted to forward spar 40 is shown in FIG. 4. A pair of fuse pins 100 are used to pivotally link the outermost end of vibration isolation arm 44 to two mounting tabs 104 formed on the inner surface of box beam 42. An axis of rotation 106 is thereby defined through the center of the two fuse pins 100. The axis of rotation 106 is orthogonal to the longitudinal axis of the box beam and to the axis of rotation 80, as previously indicated above. Fuse pins 100 are designed to shear apart if the force exerted on them exceeds a predetermined limit, an event that might occur in a catastrophic failure of engine assembly 26 or due to some other source of excessive loading. It is intended that shear pins 100 drop the engine assembly 26 from the aircraft, when necessary to preserve the aircraft's structural integrity.

Vibration isolation arm 44 is attached to the outwardly extending end of forward spar 40 with a vibration isolation mount 84, which includes an elastomeric insert 108 disposed circumferentially around the vibration isolation arm, enclosed within a retainer 110. Retainer 110 is bolted to the side of forward spar 40 using bolts 112, or other suitable fasteners. The distal end of vibration isolation arm 44 is similarly connected to the side of forward spar 40 proximate fuselage 22 using vibration isolation mount 46. Vibration isolation mount 46 comprises an elastomeric annular insert 120 circumferentially disposed around a conical-shaped surface 114, which is formed on the end of the vibration isolation arm; insert 120 is enclosed within an annular retainer 122. A nut 116 is threaded onto the end of vibration isolation arm 44, acting to longitudinally compress elastomeric insert 120 around the conical-shaped surface 114, between two washers 118, as the nut is tightened. Retainer 122 is affixed to the side of forward spar 40 using bolts 112, or other suitable fasteners.

As can be seen in FIG. 4, forward spar 40 includes a plurality of webs 124 extending between its upper and lower surface and disposed on the opposite side of the spar from that on which the vibration isolation arm 44 is mounted. Similarly, as shown in FIGS. 5 and 6, each of the other spars 60 and 62 include similar reinforcing webs 124; however, on mid spar 60, the webs are disposed on each side, while on aft spar 62, the webs are disposed only on the internal or forward facing side of the spar.

Referring now to FIG. 5, the outwardly extending end plate 64 of mid spar 60 is shown, along with details of its attachment to box beam 42. Two mounting plates 130 are connected to the endplate 64 of mid spar 60 using a plurality of rivets 134. Two fuse pins 100 extend through holes formed in two internal web plates 74 within box beam 42, proximate each end of mounting plate 130. The diameter of the holes 134 formed within mounting plates 130 is relatively large compared to the diameter of the fuse pins 100, thereby allowing substantial free play between the box beam and the mid spar mounting plate 130. Because of the clearance provided in the hole 134, mid spar 60 does not transfer load between box beam 42 and engine mounting strut 32 unless a catastrophic failure occurs in one of the other two supporting spars 40, or 62.

As shown in FIG. 5, box beam 42 is not a casting, but instead is constructed from a plurality of component parts, including sheet metal plates 136 and reinforcing corners 138, both of which are supported by internal transverse plates 74. In cross section, box beam 42 has a trapezoidal shape, with its shorter base disposed adjacent the engine assembly (see FIG. 3), and its longer base providing a supporting surface for the cowling that encloses the engine assembly.

The aft spar 62 is shown in greater detail in FIG. 6, particularly with regard to the construction of the vibration mount 78 by which its outwardly extending end, yoke 66 is connected to box beam 42. Yoke 66 includes two holes by which it is connected with fuse pins 100 to a mounting bracket 150 having an open rectangular-shaped section in which is fitted a vibration mount 78. A central hub 154 is fitted within the central opening of bracket 150, spaced from each of the internal sides of the opening by elastomeric vibration isolation pads 152. A pivot pin 156 extends throughout central hub 154 in alignment with the rotational axis 80 (see FIG. 3) of box beam 42, and each end is mounted in one of two spaced-apart internal transverse plates 74. Elastomeric vibration isolation pads 152 provide both lateral and vertical vibration decoupling of box beam 42 from aft spar 60, while pivot pin 156 pivotally connects the aft spar to the box beam.

The internal construction of torque box 48 and of vibration isolation mount 84 are shown in FIG. 7. Reinforcing webs 160 extend along the longitudinal length of close out rib 68, providing support for external skin 56, which defines the upper and lower surfaces of the torque box assembly 48. One end of close out rib 68 is connected to the outwardly extending end of forward spar 40 by a plurality of rivets 132. Although shown only in outline, forward and aft fairings 58 comprise a fiberglass lay-up molded over a honeycomb core, attached to the forward and aft edges of torque box 48. Fairings 58 provide aerodynamic leading and trailing edges for torque box assembly 48. The overall thickness of torque box assembly 48 is relatively thin compared to that which would be required of an engine mounting strut of more conventional design if built to carry the off center load presented by engine assembly 26, and must be thin due to the critical airflow requirements of props 30. Engine mounting strut 32 creates relatively minimal air drag due to its thin cross section and its aerodynamic shape provided by forward and aft fairings 58.

FIGS. 8 and 9 illustrate the manner in which an engine 86 is affixed to box beam 42. A mounting bracket 164 is attached to the forward engine mount pad 52 of box beam 42 using a suitable connector (not shown), and is connected with a "U"-shaped link 166 to mounting tabs 168, disposed on the periphery of engine 86. Mounting bracket 164, links 166 and tabs 168 are connected using bolts 170 or other suitable connectors.

In FIG. 9, a mounting bracket 180 is connected to the aft mounting pad 54 using bolts or other suitable connectors (not shown). Bracket 180 is attached to a "U"-shaped link 184, and link 184 is attached to mounting tabs 168 disposed on engine 86, using bolts 170. In addition, a pivotal connection (not shown) is provided on bracket 180 for attaching a thrust rod 188, which extends to an aft point (not shown) on engine 86. Those skilled in the art will appreciate that the mounting connections for attaching engine 86 to box beam 42 are easily accessed by folding back the cowling enclosing the engine assembly 26, and that engine 86 is easily removed for maintenance by loosening bolts (not shown) that attach the engine to the box beam.

Although engine mounting strut 32 is disclosed for use in mounting a prop fan engine assembly 26 in a laterally extending position adjacent fuselage 22, it will be apparent that a similar mounting strut could be used for mounting an engine assembly adjacent the under surface of a wing, or adjacent the vertical stabilizer of an aircraft. Box beam 42 provides distributed longitudinal support for engine assembly 26, while the orthogonal pivotal axes 80 and 106 of pivotal mounts 78 and 82 act to decouple lateral, vertical and torque related motion and vibration resulting from any imbalance which may exist in engine assembly 26 and props 30. These benefits are clearly applicable to other types of engines and mounting dispositions.

While the present invention has been disclosed with respect to a preferred embodiment and modifications thereto, further modifications will be apparent to those of ordinary skill in the art within the scope of the claims that follow. It is not intended that the invention be limited by the disclosure, but instead that its scope be determined entirely by reference to the claims which follow hereinbelow.

The embodiments of the invention in which an exclusive property or privilege is claimed are defined as follows:

1. Apparatus for mounting an engine assembly to an aircraft comprising:
   a beam extending adjacent the engine assembly, generally parallel to a longitudinal axis thereof;
   a first spar, connected at one end to a structural framework of the aircraft, the other end extending outwardly therefrom toward the beam;
   a second spar, connected at one end to the structural framework of the aircraft, the other end extending outwardly therefrom to pivotally connect to the beam about an axis that is substantially parallel to the longitudinal axis of the engine assembly;
   a vibration isolation arm, pivotally connected to the beam about an axis that is substantially orthogonal to the longitudinal axis of the engine assembly, the vibration isolation arm extending generally parallel to the first spar and resiliently attached thereto at a plurality of spaced apart points; and
   an enclosing skin covering the first and second spars and the vibration isolation arm, and extending between the structural framework of the aircraft and the engine assembly, to define a generally streamlined strut.

2. The apparatus of claim 1 further comprising a third spar disposed intermediate the first and second spars, also covered by the enclosing skin, connected at one end to the structural framework of the aircraft, the other end extending outwardly therefrom to connect to the beam at a joint having substantial free play, the third spar serving as a backup to support the engine assembly should the first or second spars fail.

3. The apparatus of claim 1 wherein the vibration isolation arm is connected to the first spar with an inboard vibration isolator and with an outboard vibration isolator.

4. The apparatus of claim 3 wherein the inboard and the outboard vibration isolators comprise a generally annular ring of elastomeric material disposed concentrically about the vibration isolation arm.

5. The apparatus of claim 1 wherein the second spar is connected to the beam with a vibration isolation mount.

6. The apparatus of claim 1 wherein the center of gravity of the engine assembly is aft of both the first and second spars, but closer to the second spar than to the first.

7. The apparatus of claim 1 wherein the first and second spars are connected proximate their outwardly extending ends by a close-out rib.

8. The apparatus of claim 1 wherein the beam comprises a generally trapezoidal cross section with internal reinforcing webs.

9. On an aircraft, a strut assembly for aerodynamically mounting an engine assembly to the frame of the aircraft and distributing a plurality of forces acting on the engine assembly through the strut assembly over a substantial lengthwise extent of the engine assembly, while providing vibration isolation between an engine carried in the engine assembly and a frame of the aircraft, comprising:
   beam means disposed within the engine assembly, along a side thereof, and extending generally parallel to a longitudinal axis of the engine assembly, for transferring a thrust force from the engine to the aircraft and for detachably connecting the engine assembly to the strut assembly, the beam means being further operative to distribute forces acting on the engine assembly over its lengthwise extent;
   a moment arm having an inner end connected to and supported by the aircraft frame and an outer end extending outwardly from the aircraft frame toward the beam means, but not rigidly connected thereto;
   a longitudinal support arm having an inner end connected to and supported by the aircraft frame and an outer end terminating in a pivotal connection to the beam means at a point that is disposed substantially closer to a center of gravity of the engine assembly than is the outer end of the moment arm, an axis of rotation of the pivotal connection being substantially parallel to the longitudinal axis of the engine assembly;
   first vibration isolating means disposed with the pivotal connection of the longitudinal support arm, for absorbing vibration;
   an isolator arm having an end pivotally connected to the beam means about an axis of rotation that is substantially transverse to that of the pivotal connection of the support arm, and an end extending outwardly from the engine assembly, generally in alignment with the moment arm and adjacent thereto;
   second vibration isolating means for resiliently connecting the isolator arm to the moment arm at a plurality of spaced apart points; and
   means for aerodynamically enclosing the moment arm, the support arm, and the isolator arm.

10. The strut assembly of claim 9 wherein the engine assembly is mounted proximate the aft portion of the aircraft and wherein the moment arm and the longitudinal support arm extend laterally from a fuselage portion of the aircraft frame.

11. The strut assembly of claim 9 wherein the engine assembly is subject to forces resulting from the engine thrust, air drag and gravity all having components directed along at least one of three orthogonal axes, of which one axis is substantially parallel to the longitudinal axis of the engine assembly.

12. The strut assembly of claim 9 further comprising a backup arm having an inner end connected to the aircraft frame intermediate the longitudinal support arm and the moment arm and an outer end including means for loosely connecting the backup arm to the beam means so that it does not provide significant support thereto unless a failure occurs in at least one of the moment arm, the isolator arm, and the longitudinal support arm.

13. The strut assembly of claim 9 wherein the beam means comprise a webbing reinforced box beam of generally trapezoidal cross-sectional shape, which is connected to the engine by at least one link.

14. The strut assembly of claim 9 wherein the engine drives an unducted propeller mounted on an aft end of the engine assembly.

15. The strut assembly of claim 9 wherein the means for aerodynamically enclosing the moment arm, the support arm, and the isolator arm comprise a forward and an aft fairing assembly and an upper and lower skin applied to surfaces defined by the extent of the moment arm and the longitudinal support arm.

16. The strut assembly of claim 9 wherein the isolator arm extends more than one half the length of the moment arm.

17. The strut assembly of claim 9 wherein the second vibration isolation means comprise an annular resilient ring disposed concentrically about the outward extending end of the isolator arm, inside a first retainer affixed to the moment arm, and a resilient vibration mount disposed about and adjacent to the end of the isolator arm attached to the beam means and held in a second retainer affixed to the outwardly extending end of the moment arm.

18. A method for mounting an engine assembly to an aircraft and providing vibration isolation between the engine assembly and the aircraft, comprising the steps of:
pivotally connecting a longitudinal support spar connected to a frame of the aircraft to a structural beam that extends internally along a side of the engine assembly, so that the engine assembly is free at that point to pivotally rotate about an axis that is substantially parallel to a longitudinal axis of the engine assembly, said pivotal connection including a vibration isolation mount;
pivotally connecting an isolator arm to the structural beam about an axis of rotation that is substantially transverse to the longitudinal axis of the engine assembly;
at a plurality of spaced apart points, resiliently connecting the isolator arm to a lateral support spar that is connected to the frame of the aircraft and extends adjacent the isolator arm; and
aerodynamically enclosing the longitudinal and lateral support spars and the isolators arm with a generally smooth, lightweight skin.

19. The method of claim 18 wherein the engine assembly has a center of gravity that is substantially offset from its geometric center and is disposed relatively closer to the longitudinal support spar than to the lateral support spar.

20. The method of claim 18 wherein the structural beam comprises a generally trapezoidal shaped cross section with a plurality of internal reinforcing webs, the structural beam being detachably connected at a plurality of points to support an engine disposed in the engine assembly.

21. The method of claim 18 wherein the isolator arm is resiliently connected to the lateral support spar by means of an annular shaped support concentrically disposed about said isolator arms.

22. The method of claim 18 further comprising the step of loosely connecting the structural beam to the frame of the aircraft with a backup arm operative to support the engine assembly in the event that one of the longitudinal and lateral support arms fails.

23. The method of claim 18 wherein the step of aerodynamically enclosing comprises the steps of providing a forward and an aft fairing and attaching the lightweight skin to surfaces defined by the extent of the lateral and longitudinal support spars.

* * * * *

UNITED STATES PATENT AND TRADEMARK OFFICE
CERTIFICATE OF CORRECTION

PATENT NO. : 4,821,980

DATED : April 18, 1989

INVENTOR(S) : Clausen et al.

It is certified that error appears in the above-identified patent and that said Letters Patent is hereby corrected as shown below:

| Column | Line | |
|---|---|---|
| 3 | 65 | "fordwardmost" should be --forwardmost-- |
| 4 | 6 | "vibrating" should be --vibration-- |
| 4 | 28 | After the word "other" insert --spars-- |

Signed and Sealed this

Twenty-fourth Day of July, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,821,980

DATED : April 18, 1989

INVENTOR(S) : Clausen et al.

It is certified that error appears in the above-identified patent and that said Letters Patent is hereby corrected as shown below:

ON TITLE PAGE:

Section [73]  "Assignee: The Boeing Company, Seattle, Wash."
should be --Assignees: The Boeing Company, Seattle, Wash. and Lord Corporation, Erie, Penn.--

Signed and Sealed this

Third Day of December, 1991

*Attest:*

HARRY F. MANBECK, JR.

*Attesting Officer*  *Commissioner of Patents and Trademarks*